(12) United States Patent
Pham

(10) Patent No.: US 10,655,450 B2
(45) Date of Patent: May 19, 2020

(54) IFR1 SURVEY METHODOLOGY

(71) Applicant: CONOCOPHILLIPS COMPANY, Houston, TX (US)

(72) Inventor: Son V. Pham, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 70 days.

(21) Appl. No.: 15/937,139

(22) Filed: Mar. 27, 2018

(65) Prior Publication Data

US 2019/0055834 A1 Feb. 21, 2019

Related U.S. Application Data

(60) Provisional application No. 62/476,958, filed on Mar. 27, 2017.

(51) Int. Cl.
| | | |
|---|---|---|
| *E21B 47/02* | (2006.01) | |
| *E21B 47/022* | (2012.01) | |
| *E21B 47/024* | (2006.01) | |
| *G01V 3/40* | (2006.01) | |
| *E21B 7/04* | (2006.01) | |
| *E21B 49/00* | (2006.01) | |
| *G01V 3/26* | (2006.01) | |

(52) U.S. Cl.
CPC .............. *E21B 47/022* (2013.01); *E21B 7/04* (2013.01); *E21B 47/024* (2013.01); *E21B 49/00* (2013.01); *G01V 3/26* (2013.01); *G01V 3/40* (2013.01)

(58) Field of Classification Search
CPC ........ E21B 47/002; E21B 49/00; E21B 47/02; E21B 7/04; G01V 3/26; G01V 3/40
See application file for complete search history.

(56) References Cited

U.S. PATENT DOCUMENTS

| | | | |
|---|---|---|---|
| 6,021,577 A | 2/2000 | Shiells et al. | |
| 2009/0044981 A1* | 2/2009 | Sheppard | E21B 7/06 175/24 |
| 2013/0002257 A1* | 1/2013 | McElhinney | E21B 47/02224 324/346 |
| 2013/0173164 A1 | 7/2013 | Zhang | |
| 2016/0024847 A1 | 1/2016 | Benson et al. | |

OTHER PUBLICATIONS

Williamson, H.S., et al—"Application of Interpolation In-Field Referencing to Remote Offshore Locations [IFR2]", 1998, SPE-49061-MS, Society of Petroleum Engineers, pp. 387-398; 12 pgs.

(Continued)

*Primary Examiner* — Yong-Suk Ro
(74) *Attorney, Agent, or Firm* — Conocophillips Company

(57) ABSTRACT

An improved in-field referencing 1 (IFR1) technique is provided, wherein a single mid-lateral well measurement of local magnetic field is used. In one aspect of directional drilling, a single set of IFR values for a planned well is obtained. The single set of IFR values is captured at a single location in a mid-lateral section of the planned well. A global magnetic model corresponding to the Earth's magnetic field is obtained. An improved magnetic model is generated by correcting the global magnetic model for local anomalies using the single set of IFR values.

20 Claims, 3 Drawing Sheets

(56) References Cited

OTHER PUBLICATIONS

Russell, J.P., et al—"Reduction of Well-Bore Positional Uncertainty Through Application of a New Geomagnetic in-Field Referencing Technique [IFR2]", 1995, SPE-30452-MS, Society of Petroleum Engineers, pp. 1-16; 16 pgs.
Buchanan, A., et al, "Geomagnetic Referencing—the Real-Time Compass for Directional Drillers", 2013, Oilfield Review, Autumn 2013, p. 32-47; 16 pgs.
International Search Report, PCT/US2018/024566 dated Jun. 14, 2018, 2 pgs.

* cited by examiner

| Model | Organization | Order | Resolution, km | Update Interval |
|---|---|---|---|---|
| WMM | NOAA, NGDC, and BGS | 12 | 3,334 | 5 years |
| IGRF | IAGA | 13 | 3,077 | 5 years |
| BGGM | BGS | 50 | 800 | 1 year |
| EMM and HDGM | NOAA and NGDC | 720 | 56 | 5 years and 1 year |

IFR1 SURVEY METHODOLOGY

PRIOR RELATED APPLICATIONS

This application is a non-provisional application which claims benefit under 35 USC § 119(e) to U.S. Provisional Application Ser. No. 62/476,958 filed Mar. 27, 2017, entitled "IFR1 SURVEY METHODOLOGY," which is incorporated herein in its entirety.

FEDERALLY SPONSORED RESEARCH STATEMENT

Not applicable.

FIELD OF THE DISCLOSURE

The invention relates to drilling oil and gas wells, and in particular to methods of well ranging using magnetic surveying methods.

BACKGROUND OF THE DISCLOSURE

In the oil and gas industry, "well ranging" or "wellbore surveying" is the art of determining exactly where an underground well is so that the next well can either intersect or avoid it, as needed. Only under ideal conditions will the path of a drilled hole follow the original dip (or inclination) and azimuth (or direction) established at the top of the hole. It is more typical that the borehole will be deflected from the intended direction as a result of layering in the rock, the variation in the hardness of the layers, and the angle of the drill bit relative to these layers.

Because one of the purposes of a borehole is to obtain information in the third dimension—i.e. at depth—the location is just as important as the information itself. Most often the information consists of the geology of the drill core or assays of the core at selected depths. If the hole has deviated significantly, then that information cannot be properly assigned to a location in 3-dimensional space beneath the earth's surface. Conclusions about geological structure or models of the size, shape, tonnage and average grade of ore-bodies based on the 'mis-placed' information will be incorrect.

Furthermore, in crowded fields it may be necessary to avoid drilling in already tapped payzones and/or avoid existing wells, or it may be desired to intersect a given well at a particular depth and angle. Indeed with unconventional oil development, unusual well configurations are often needed to realize the value of a play and may be the norm rather than the exception.

Thus, determining the distance and direction between wellbores is critical in many applications, in addition to being used for relief-well applications, parallel twinning for developments such as steam-assisted gravity drainage (SAGD) and coalbed methane (CBM) horizontal-to-vertical intersections. As more fields mature, ranging technology can be used in other applications such as plug and abandonment wells, frac recovery, and for in-fill applications where anti-collision and relative wellbore positioning between multiple wells is of concern.

Although a proven technique, conventional wellbore surveying methodology acquires a discrete number of positional measurements along the well path, which suffer a compounding error from each survey station to the next, generating a positional ellipse of uncertainty (EOU). Because of the cumulative and systematic errors inherent in measurement-while-drilling (MWD) or gyroscopic tools, the measured survey coordinates of the wellbore will have increasing uncertainty with depth, making it practically impossible to accurately steer a well to target by relying solely on survey data of the drilling and target wellbores.

Magnetic directional surveys use measurements of the Earth's field derived from sensors in the survey tool to establish the orientation of the tool with respect to the directional reference defined by the Earth's magnetic field vector. The accuracy of magnetic surveys is compromised as a result of variations and local distortions in the reference magnetic field. Magnetic interference may be defined as corruption of the geomagnetic field by a field from an external source. This can cause serious errors in measuring hole direction (azimuth). Potential sources of magnetic interference are:

Drillstrings
Adjacent wells
Casing shoes
Magnetic formations
"Hot spots" in nonmagnetic drill collars
variations in the magnetic field caused by different rock formations in the earths crust,
variations in magnetic field caused bby solar wind or solar flares.

Although all the previous error sources may compromise the magnetic survey's quality, drillstring (axial) interference is probably the most common and frequent cause of errors in hole direction. The drillstrings may be regarded as a steel-bar, dipole magnet. The normal approach for magnetic survey tools is to place the survey sensor within sufficient quantity of nonmagnetic drill collars in the bottomhole assembly (BHA). Azimuth measurement errors are minimized by virtue of their distance from the interference source. Magnetic interference diminishes proportionally with the inverse of the square of the distance from the source. However, the bar-dipole-magnet analogy is simplistic. There is evidence that downhole drillstring magnetism may be much more complex, even dynamic in nature. In practice, it may be hard to remove interference completely.

There are several techniques to correct the effects of magnetic interference of crustal and solar anomalies, one of which is "in field referencing" or "IFR". In-field-referencing is the name given to the practice of measuring the geomagnetic field at, or close to, a drilling site. Measurement of the local geomagnetic conditions during surveys can significantly reduce survey errors and directional uncertainty. IFR techniques thus have the potential to improve the accuracy of magnetic surveys.

The best insurance against crustal anomalies is a site survey to measure the local magnetic parameters in real-time to map the local anomalies, and apply them as corrections to one of the global models. This is known as "IFR1" herein.

The Earth's magnetic field also varies with time due to solar-driven external fields that can be both regular daily or diurnal variations, as well as irregular disturbances in the magnetic fields caused by solar flares. One enhancement of the IFR method is to determine the rapidly varying external field using nearby observatory data. This enhancement is referred to as Interpolation In-Field Referencing (IIFR or "IFR2"). However, the method does require that there be such local observatories and to date not all fields have them.

Applications with IFR1 vary in their work-flow. Sometimes magnetic data at the wellhead is used (FIG. 1A) or a single point at the bottom hole assembly is used (FIG. 1C). Sometimes the reference values at the well head are simply replaced by more accurate IFR1 values taken at various sections of well, FIG. 1B. The most accurate method is to compute a geomagnetic reference value for every downhole survey, as shown in FIG. 1D. Although more accurate, this method is labor intensive, requiring cessation of drilling while the needed magnetic data is collected, and also being compute intensive.

Thus, there remains a continuing need in the art for ever-improved borehole surveying methods, systems and devices to increase the accuracy of borehole surveying. The ideal method would be fast, easy to use, cost effective, but without sacrificing accuracy.

SUMMARY OF THE DISCLOSURE

In borehole surveying, depth is typically acquired by drill pipe measurements, while inclination and azimuth are achieved from gravitational and magnetic field measurements. Horizontal drilling operations in the oil industry utilize the measurement while drilling (MWD) technique. MWD incorporates a package of sensors including a tri-axial magnetometer and a tri-axial accelerometer mounted in three mutually orthogonal directions inserted within a downhole probe. The sensors monitor the position and the orientation of the bottom-hole-assembly (BHA) during drilling by instantaneous measuring of magnetic and gravity conditions while the BHA is completely stationary.

A perpendicular pair or an orthogonal triad of accelerometers measure the Earth's gravity field to determine the BHA inclination and tool face angles while the magnetometers measure the geomagnetic components to determine the BHA azimuth at some predetermined survey stations along the wellbore path.

Magnetic survey tools thus rely on the principle of measuring the direction of the well bore relative to the direction of the local geomagnetic field. The hole direction can then be referenced to a geographic coordinate system from a knowledge of the direction of the geomagnetic field, relative to true north. This true north reference direction is normally obtained from charts or from a computerized model of the geomagnetic main-field.

In a directional survey of wellbore, many sources of uncertainty can degrade accuracy, including gravity model errors, depth errors, sensor calibration, instrument misalignment, BHA bending, centralization errors, and the various sources of magnetic discrepancies, such as crustal field anomalies.

Crustal field anomalies are often significant for directional drilling (several tenths of a degree and more). The crustal field varies only on geological timescales, and can therefore be considered as a static offset to values derived from global models. In-Field Referencing is the provision of magnetic field estimates at a series of locations along a planned wellbore path, which include estimates of the crustal field from local observations. IFR1 utilizes the BGGM or IGFR or other model and the harmonic properties of total field anomalies, typically from airborne or marine surveys to estimate the combined core and crustal field vector. Accurate geomagnetic measurements are also possible at land locations, provided care is taken to avoid interference from the rig and drilling hardware, and other man-made sources of magnetic interference. IFRI improves the resolution of the local field down to kilometer scales. The local geomagnetic field is determined with high accuracy using IFR1 and the MWD data can then be used to give the drilling location in a geographic reference frame.

This disclosure provides an improved IFR1 technique wherein a single mid-lateral well measurement of local magnetic field is used instead of single wellhead or BHA points of measurement, or a plurality of wellbore measurement methods.

Surprisingly, our tests of 12 actual wells demonstrated that using a single mid-lateral point of magnetic field measurement (FIG. 2) provides results as accurate as prior gyroscope based measurements.

Although the method herein relates to IFR1, it can of course be combined with IFR2 methods, as well as other methods of improving accuracy that are known, and a few of such methods are described herein, including multi-station analysis or "MS", axial interference correction or "AX," SAG, which is correction for the mis-alignment of the tool axis with the axis of the wellbore, hard and soft-iron algorithms, adaptive filtering, and the like.

The IFR1 technique can be used anywhere that IFR1 techniques are used, especially in directional drilling, borehole surveys, and the like.

The invention includes any one or more of the following embodiments, in any combination(s) thereof:

In one embodiment, directional drilling is described where: measuring local geomagnetic field data by a single spot measurement of the earth's magnetic field at about a midpoint of a planned lateral well; combining said local geomagnetic field data with a model of the earth's magnetic field to provide an improved model of the earth's magnetic field; obtaining downhole magnetic field data by means of a surveying instrument along a borehole being drilled for said planned lateral well; determining an orientation of said borehole from said downhole magnetic field data and said improved model of the earth's magnetic field; and using said determined orientation in further directional drilling of said borehole.

In an additional embodiment, a drilling pathway is controlled by: obtaining local geomagnetic field data by a single spot measurement of the earth's magnetic field at about a midpoint of a planned lateral well; combining said local geomagnetic field data with a model of the earth's magnetic field to provide an improved model of the earth's magnetic field; obtaining downhole magnetic field data by means of a surveying instrument a magnetic field at a series of locations along a borehole being drilled for said planned lateral well; determining the orientation of the borehole from said downhole magnetic field data and said improved model of the earth's magnetic field; and steering a steerable drilling bit based on the results from step d to continue drilling said planned lateral well.

In another embodiment, directional drilling, is conducted by measuring a local magnetic declination (D), magnetic inclination (I) and magnetic field strength (F) at a single point about midway in a lateral section of a first lateral well; combining said measured D, I and F with a global magnetic model to create an improved magnetic model (IMM); determining a pathway of said first wellbore using said IMM; optionally repeating steps a-c for one or more existing lateral wells; directional drilling a second wellbore using the data generated in steps c and d to drill a preplanned drilling path for said second wellbore.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

As used herein, "BBGM" refers to the "BGS Global Geomagnetic Model"—a model of the Earth's present and future magnetic field. It is derived every year and is available under license along with the associated software. The accuracy of this model is maintained and, where possible, improved by continuous updates to the datasets on which it is based, and development of the modeling techniques employed.

As used herein, the "IGFR" or "International Geomagnetic Reference Field" is the IGRF is another global model of the geomagnetic field. It allows spot values of the geomagnetic field vector to be calculated anywhere from the Earth's core out into space.

Other models include the World Magnetic Model (WMM), the Enhanced Magnetic Model (EMM) and the High-Definition Geomagnetic Model (HDGM). See FIG. 3. There are many other models in addition to these. See space.dtu.dk/english/Research/Scientific_data_and_models/Magnetic_Field_Models.

As used herein, "IFR" or "IFR1" is in field referencing using one or more local spot measurements of local magnetic fields. These measurements are typically taken by air, but can also be done on the surface. The standard for measurement of F is the proton precision magnetometer. The modern standard instrument for D and I measurements is a nonmagnetic theodolite with a fluxgate sensor mounted on its telescope. For measurement of D, a true north reference is required. This may be determined by means of astronomical observations or by using a higll-accuracy north-seeking gyro mounted on the theodolite. Total field (F) anomalies at surface are Fourier transformed to extract declination (D) and inclination (I) anomalies at surface. The anomalies are downward continued to derive D, I and F anomalies at depth.

The "azimuth" is the angle formed between a reference direction (usually true north) and a line from the observer to a point of interest projected on the same plane as the reference direction orthogonal to the zenith. Azimuth is usually measured in degrees)(°.

"Inclination" or "I" is the angle between the magnetic field vector and the horizontal plane.

"Declination" or "D" is the angle in the horizontal plane between magnetic north and geographic north.

The following abbreviations are used herein:

| ABBREVIATION | TERM |
| --- | --- |
| AMR | Active magnetic ranging |
| AX | Axial interference correction |
| BBGM | BGS Global Geomagnetic Model |
| BGS | British Geological Survey |
| BHA | Bottom hole assembly |
| D | Declination |
| EMM | Enhanced Magnetic Model |
| EOU | Ellipse of uncertainty |
| F | Magnetic field. |
| HDGM | High-Definition Geomagnetic Model |
| I | Inclination |
| IFR1 | In field referencing using spot measurements at the well |
| IGFR | International Geomagnetic Reference Field |
| LWD | Logging while drilling |
| MAS | Multistation analysis |
| MGOe | Mega Gauss Oersteds |
| MGT | Magnetic guidance tool |
| MWD | Measurement while drilling |
| PMR | Passive magnetic ranging |
| RMRS | Rotary magnetic ranging system |
| SML | Continuous Magnetic Logging |
| SWG | Single wire guidance |
| TD | Total depth |
| WMM | World Magnetic Model |

BRIEF DESCRIPTION OF THE DRAWINGS

FIG. 1A using a single measurement taken at the wellhead. FIG. 1B using a point for each section of well. FIG. 1C. Using a single measurement at the bottom hole assembly. FIG. 1D using a multiplicity of point measurements taken along the entire well length.

DETAILED DESCRIPTION OF THE DISCLOSURE

Figure 1A:
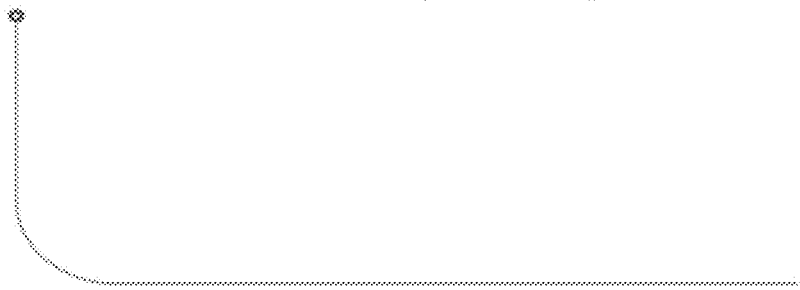
FIG. 1A-D. Prior art IFR1 methods.
Figure 1B:
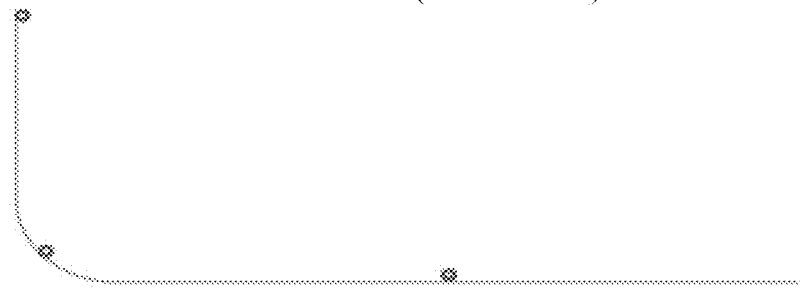
Figure 1C:
Figure 1D:
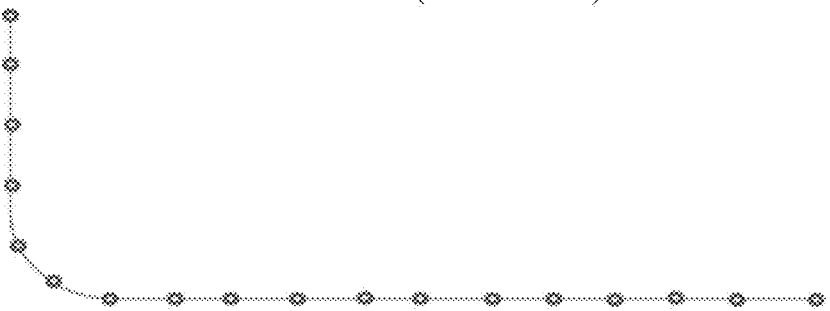
Figures 2, 3:
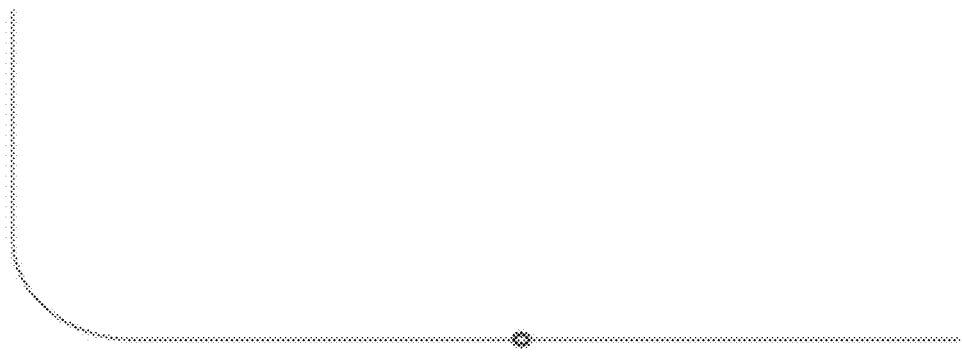
FIG. 2. Inventive method using a single mid-lateral point of measurement for IFR.
FIG. 3. Geomagnetic models, from Buchanan (2013).

The disclosure provides a novel method of well ranging using a modified IFR1 approach, wherein a single, mid-lateral well measurement of local magnetic field is taken and used in the subsequent calculations. This method provides accurate results, yet is quick and easy, consistent with current work flow.

Smaller positional uncertainty of horizontal wells reduces the danger of collisions, leads to better well placement and improves production from the reservoir. One of the largest sources of error in directional drilling is the use of inaccurate reference values for the geomagnetic field. This source of error can be reduced significantly by using an In-Field Referencing (IFR1) model derived from e.g., aeromagnetic measurements.

We performed a study of existing, premapped wells to provide proof of concept herein. The purpose was to study the impact of IFR1 on wellbore position accuracy. A sample of 12 wells was selected from the Bakken Field. Ellipses of uncertainty (EOU) for standard MWD were compared with EOUs for post-processing using axial corrections, IFR, multi-station analysis and tool sag. For a typical Bakken well, these advanced techniques reduced the lateral uncertainty in the wellbore position by 43% and the vertical uncertainty by 38%.

The wellbore position at total depth (TD) was then recomputed by replacing the geomagnetic declination with the more accurate local IFR1 values taken along the entire lateral well path. This shifted the lateral position of the well at TD by up to 94 ft.

In order to avoid complexity in the IFR work flow, it was further investigated whether a single reference declination could be used for the entire well. Using the IFR declination at the wellhead creates a lateral error of up to 26 ft. If the declination is instead taken at the center of the lateral section (a "mid-lateral" declination), this error is reduced to a negligible 1.3 ft maximum error at TD.

The preceding investigation shows that taking the IFR1 value at the center of the lateral section results in an almost equivalent well trajectory to using the actual IFR1 value for every survey location along the well path. For the selected wells, the maximum difference in the location at TD was 1.3 feet. The maximum deviation of the actual IFR1 values from the mean IFR1 value at the center of the lateral was found to be 19.4 nT for the total field, 0.03° for the dip and 0.03° for the declination. These are very small deviations. It was therefore concluded that only a single set of reference values needs to be used, namely the IFR values at about the center of the lateral section.

Using a single mid-lateral reference value for IFR1 is beneficial because considerably less measuring need occur, and the method fits easily into current workflow with little modification. It is considerably less work intensive than measuring declination over several points along the entire well length, and less compute intensive. Yet surprisingly, the results were comparable to more extensively analyzed methods.

Test 1: Lateral Uncertainty

Advanced processing reduces the uncertainty of the position of the wellbore. The following processing methods were compared in terms of their effect on ellipses of uncertainty (EOU):

MWD: Standard Measurement While Drilling without post processing

+AX: With axial interference correction for the magnetization of the drill string. This improves mostly the lateral position.

+IFR1: Using more accurate geomagnetic reference values from an IFR crustal magnetic model, again improving mostly the lateral position.

+MS: Multi-station analysis estimates accelerometer and magnetometer biases, scale factors and axial interference (essentially the bz bias) in a single inversion using all of the surveys of a tool run. This replaces the axial correction and improves both the lateral and vertical position.

+SAG: Correction for the mis-alignment of the tool axis with the axis of the wellbore. This improves only the vertical position.

Test 2: Vertical Uncertainty

Uncertainty in the vertical position can be reduced by Multi-Station analysis (MS) and by tool sag correction (SAG).

TABLE 2

Vertical Uncertainty

| Well | Vertical Depth (ft) | MWD (ft) | MWD + IFR1 + SAG + MS (ft) |
|---|---|---|---|
| Well #1 | 10579 | 79 | 49 |
| Well #2 | 10833 | 80 | 49 |
| Well #3 | 10514 | 87 | 53 |
| Well #4 | 10929 | 81 | 50 |
| Well #5 | 11188 | 80 | 50 |
| Well #6 | 11112 | 95 | 58 |
| Well #7 | 10908 | 79 | 49 |
| Well #8 | 10333 | 87 | 53 |
| Well #9 | 10706 | 80 | 50 |
| Well #10 | 11033 | 81 | 50 |
| Well #11 | 10763 | 80 | 50 |
| Well #12 | 10744 | 79 | 49 |
| Average | 10804 | 82 | 51 |
| Maximum | 11188 | 95 | 58 |
| Depth Uncertainty Reduction | | | 38% |

Test 3: Mid-Point Lateral Declination

Inaccurate reference declination leads to erroneous azimuth determinations for the well. This effect was investigated here by changing the well azimuth at every survey point by the difference between the BGGM declination and the IFR1 declination (first column in Table 3). One of the important additional questions to be addressed in this test was whether a single set of geomagnetic reference values could be used for the entire well path.

The values in the second and third columns show the error resulting from using a single reference declination, versus using the correct declination at every survey point. It turns out that using a single reference value at the center of the lateral well gives a well path that is almost identical to the path when the correct IFR declination is used for every survey point for wells in the Bakken Field.

TABLE 1

Lateral Uncertainty

| | Lateral Length (ft) | Oriented | MWD (ft) | MWD + AX (ft) | MWD + IFR1 (ft) | MWD + AX + IFR1 (ft) | MWD + IFR1 + SAG + MS (ft) |
|---|---|---|---|---|---|---|---|
| Well #1 | 9976 | S | 226 | 205 | 167 | 134 | 132 |
| Well #2 | 9919 | N | 223 | 202 | 165 | 131 | 126 |
| Well #3 | 10990 | S | 245 | 224 | 180 | 145 | 143 |
| Well #4 | 10082 | N | 223 | 203 | 162 | 130 | 127 |
| Well #5 | 10135 | S | 229 | 208 | 171 | 137 | 136 |
| Well #6 | 11707 | N | 253 | 233 | 182 | 148 | 142 |
| Well #7 | 10045 | S | 222 | 202 | 162 | 130 | 129 |
| Well #8 | 11093 | S | 250 | 227 | 185 | 148 | 145 |
| Well #9 | 9969 | S | 226 | 205 | 167 | 134 | 125 |
| Well #10 | 10100 | S | 229 | 208 | 170 | 137 | 135 |
| Well #11 | 10041 | N | 221 | 202 | 161 | 130 | 124 |
| Well #12 | 9722 | N | 220 | 199 | 163 | 130 | 121 |
| Average | 10315 | | 231 | 210 | 169 | 136 | 132 |
| Maximum | 11707 | | 253 | 233 | 185 | 148 | 145 |
| EOU Reduction | | | | 9% | 27% | 41% | 43% |

TABLE 3

Mid-Point Lateral Declination

| Well | No IFR (ft) | IFR at Wellhead (ft) | IFR at Center of Lateral (ft) |
|---|---|---|---|
| Well #1 | 94.1 | 26.5 | 1.3 |
| Well #2 | 38.4 | 10.8 | 0.4 |
| Well #3 | 47.4 | 24.5 | 0.4 |
| Well #4 | 53.7 | 20.4 | 0.6 |
| Well #5 | 18.8 | 4.7 | 0.5 |
| Well #6 | 24.4 | 12.2 | 0.3 |
| Well #7 | 19.6 | 2.2 | 0.4 |
| Well #8 | 12.4 | 3.1 | 1.1 |
| Well #9 | 6.2 | 4.5 | 1.0 |
| Well #10 | 41.6 | 13.5 | 0.5 |
| Well #11 | 10.5 | 3.5 | 0.1 |
| Well #12 | 33.3 | 9.6 | 0.5 |

Test 4: Different Work Flows

In the previous section, it was shown that taking the reference declination at the center of the lateral gives almost the same well position as taking the reference declination at every survey point. However, the dip (magnetic inclination) and total magnetic field also have to be considered. First of all they are used as QA/QC criteria. If the total field or dip reference is inaccurate, valid surveys may inadvertently be discarded or disturbed surveys may pass QC. Furthermore, the total field and dip are also used to estimate axial interference in the so-called short collar correction. Inaccuracies in the total field and dip reference therefore generate additional errors in the well path azimuth.

Table 4 shows the errors in the magnetic reference values for the lateral section, where accurate geomagnetic reference values matter the most. Three scenarios were investigated: In case there is No IFR, maximum errors amount to 262 nT for Btotal, 0.1° for the dip and 0.55° for the declination. Replacing the global BGGM value with a single IFR value at the well head reduces these errors to 163 nT for Btotal, 0.03° for the dip and 0.16° for the declination. This is a significant reduction, but the remaining error is still too large. The best result is achieved when using a single set of IFR values taken at the mid-lateral section. This reduces the errors to a negligible 19 nT for Btotal, 0.03° for the dip and 0.03° for the declination.

Wellbore Surveying

Today, directional drillers rely primarily on real-time MWD measurements of gravitational and magnetic fields using ruggedized triaxial accelerometers and magnetometers. Other categories of survey tools include magnetic multishot tools, inclination-only tools and a family of tools based on the use of gyroscopes, or gyros. Unlike MWD tools, many of these specialty tools are run as wireline services, thus requiring cessation of the drilling process. Increasingly, however, gyroscopic tools are also being incorporated into downhole steering and surveying instruments for use while drilling.

Figure 4:
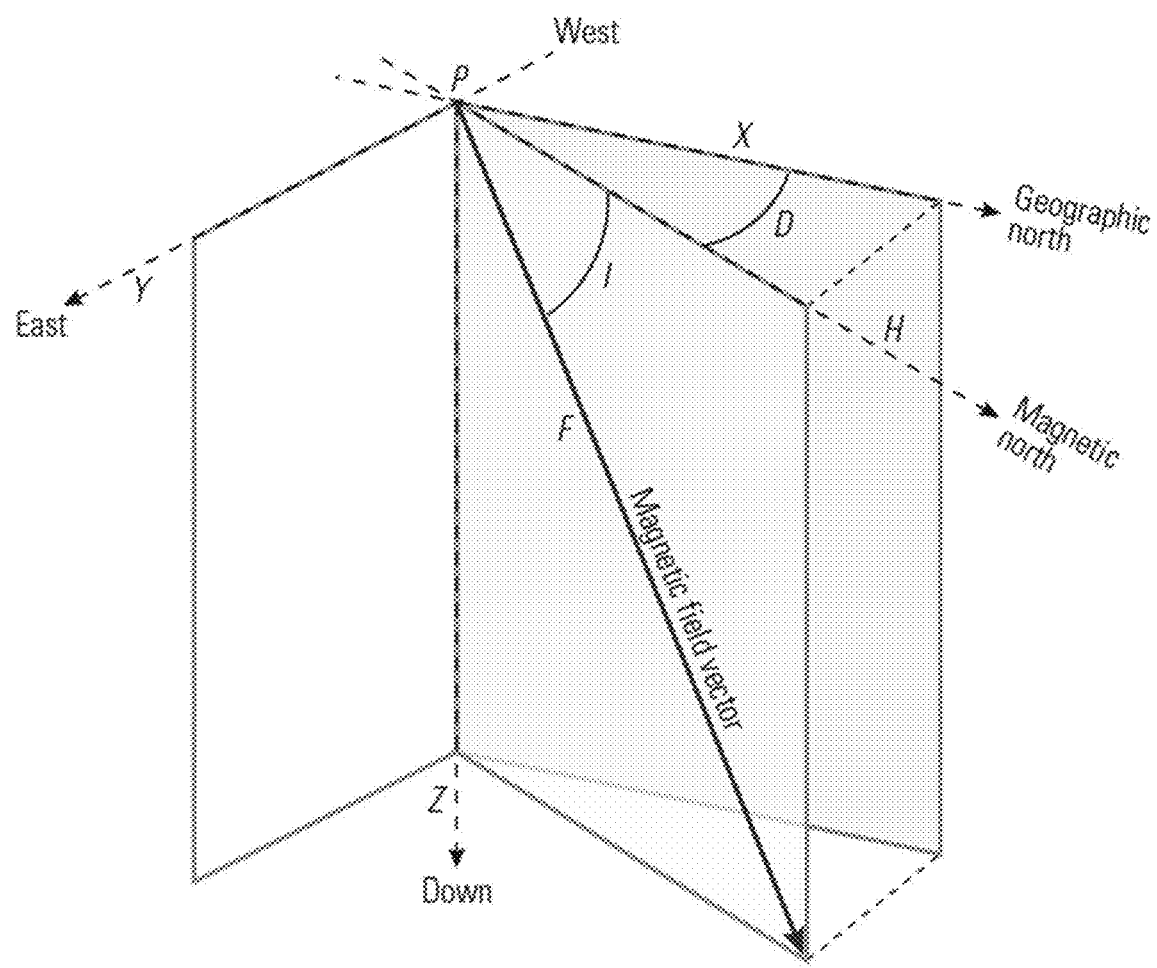
FIG. 4. Magnetic field orientation, from Buchanan (2013).

Triaxial accelerometers measure the local gravity field along three orthogonal axes. These measurements provide the inclination of the tool axis along the wellbore as well as the toolface relative to the high side of the tool. Similarly, tri-axial magnetometers measure the strength of the Earth's magnetic field along three orthogonal axes. From these measurements and the accelerometer measurements, the tool determines azimuthal orientation of the tool axis relative to magnetic north. Conversion of magnetic measurements to geographic orientation is at the heart of MWD wellbore surveying. The key measurements are magnetic dip (also called magnetic inclination), total magnetic field and magnetic declination (FIG. 4).

The magnetic field associated with the Earth's crust arises from induced and remanent magnetism. The crustal field—also referred to as the anomaly field—varies in direction and strength when measured over the Earth's surface. It is relatively strong in the vicinity of ferrous and magnetic materials, such as in the oceanic crust and near concentrations of metal ores, and is the focus of geophysical mineral exploration.

The technique of infield referencing (IFR) makes use of data from local magnetic surveys at or near a wellsite to characterize the crustal magnetic field, thus correcting the global model for local anomalies. Surveying engineers use IFR1 to extend the main magnetic field model and provide the best estimate of the local magnetic field, which is critical for geomagnetic referencing and multi-station drillstring

TABLE 4

| Well | No IFR | | | IFR at Well Head | | | IFR at Center of Lateral | | |
|---|---|---|---|---|---|---|---|---|---|
| | Btotal (nT) | Dip (°) | Dec (°) | Btotal (nT) | Dip (°) | Dec (°) | Btotal (nT) | Dip (°) | Dec (°) |
| Well #1 | 100.5 | 0.04 | 0.55 | 97.7 | 0.02 | 0.16 | 2.7 | 0.02 | 0.01 |
| Well #2 | 203.5 | 0.05 | 0.23 | 163.4 | 0.01 | 0.07 | 19.4 | 0.01 | 0.01 |
| Well #3 | 223.4 | 0.05 | 0.23 | 137.3 | 0.03 | 0.13 | 5.9 | 0.02 | .0.1 |
| Well #4 | 146.5 | 0.07 | 0.32 | 128.8 | 0.02 | 0.13 | 11.7 | 0.01 | 0.02 |
| Well #5 | 91.0 | 0.04 | 0.12 | 79.4 | 0.01 | 0.04 | 7.8 | 0.01 | 0.02 |
| Well #6 | 97.1 | 0.03 | 0.14 | 96.9 | 0.01 | 0.08 | 10.3 | 0.01 | 0.02 |
| Well #7 | 108.7 | 0.07 | 0.12 | 113.3 | 0.02 | 0.02 | 11.4 | 0.01 | 0.01 |
| Well #8 | 261.8 | 0.03 | 0.08 | 162.4 | 0.03 | 0.04 | 7.7 | 0.03 | 0.03 |
| Well #9 | 230.0 | 0.08 | 0.06 | 149.0 | 0.03 | 0.05 | 16.8 | 0.01 | 0.03 |
| Well #10 | 121.9 | 0.10 | 0.25 | 109.1 | 0.03 | 0.09 | 11 | 0.01 | 0.02 |
| Well #11 | 155.8 | 0.06 | 0.07 | 144.1 | 0.01 | 0.03 | 13 | 0.01 | 0.01 |
| Well #12 | 205.7 | 0.05 | 0.21 | 163.0 | 0.01 | 0.07 | 18.2 | 0.01 | 0.01 |
| Average Error | 16.2 | 0.06 | 0.20 | 128.7 | 0.02 | 0.08 | 11.3 | 0.01 | 0.02 |
| Maximum Error | 261.8 | 0.10 | 0.55 | 163.4 | 0.03 | 0.16 | 19.4 | 0.03 | 0.03 | compensation. These techniques allow magnetic surveying even at high latitudes, where the local magnetic field exhibits extreme variations.

In more detail, the method generally entails the following steps:
1) Drilling a first wellbore having a lateral section.
2) Measuring a local magnetic declination at about midway in said lateral section using e.g. aeromagnetic surveying.
3) Combining said measured local magnetic declination with a global magnetic model to create an improved magnetic model (IMM).
4) Determining a pathway of said first wellbore using said IMM.
5) Steps 1-4 can be repeated for all or a portion of existing wellbores.
6) Drilling a second wellbore using the data generated in steps 4 and 5.

In another embodiment, the method generally entails the following steps:
1) Planning an approximate first wellbore pathway having a lateral section.
2) Measuring a local magnetic declination at about midway in said planned lateral section using e.g. aeromagnetic surveying.
3) Combining said measured local magnetic declination with a global magnetic model to create an improved magnetic model (IMM).
4) Adjusting said planned approximate wellbore pathway as needed based on the data obtained in step 3 to prepare a planned improved wellbore pathway.
5) Directional drilling said planned improved wellbore pathway using the data generated in step 4.

The methods of the disclosure can be applied in many different applications, including but not limited to:

Wellbore Clearance/Avoidance:

Twinning (also referred to as Handrail), the term given to the placement of a new wellbore in an offset parallel position to the existing wellbore for several purposes.

Frac Recovery—The term used for an application where the drilling of a lower cost replacement wellbore into the region of a costly fracture stimulation zone of an existing wellbore that has been rendered non-productive. In areas where subsurface damage has occurred, it has proven to be cost effective to twin the new wellbore into the productive zone to restore production as opposed to fracturing the well.

Anti-Collision—Due to prolific number of multi-well projects both on and offshore, Anti-Collision or Collision Avoidance applications are done on a regular basis. As well spacing is critical both at surface and at depths where wellpaths cross.

Ghost Well is a term used to describe the application where magnetic surveying is used to monitor the surrounding magnetic field of a new wellbore to ensure that no "ghost wells" are encountered. Often magnetic interference is detected at a depth where another wellbore is not supposed to be located. PMR allows the operator to determine the source and offset of the interference rather than take a chance and drill ahead.

In cases where a wellbore is being directionally kicked off in proximity to magnetic interference, Kick-Off Assurance is the term used to describe the use of magnetic surveying to guide the wellbore away from the casing string or fish in the well being sidetracked or away from offset wells.

Wellbore Intercept:

Intercepts are when magnetic surveying is used to intentionally guide the wellbore to a direct collision course with the target wellbore. Three primary applications for Intercept are:

Relief Well—amongst the most challenging applications of intercept due to the critical timeline to regain control of the blowing well and minimize environmental impact.

Plug and Abandon—many wells, particularly in very old fields or in extremely corrosive environments may not be plugged conventionally due to issues related to uphole casing condition. Magnetic surveying allows a remedial well (new drill or sidetrack from existing) to intercept the damaged well at the appropriate depth(s) to satisfy abandonment requirements.

Fish Bypass—In some instances a fish (drillstring or casing) may become off bottom (open hole below). Magnetic surveying may be used to drill next to the fish and re-enter the open hole below the fish.

Remote Operations:

Often an operator is drilling in a remote area or suddenly encounters magnetic interference where none was expected. Having the ability to remote range allows the operator to have the rig send the magnetic surveying raw data over a high speed connection to a data center for remote analysis preventing costly shutdown of drilling operations and taking a chance of drilling ahead without precise knowledge of the source of interference.

The following references are incorporated by reference in their entirety for all purposes.

Buchanan, et al, Geomagnetic Referencing—The Real-Time Compass for Directional Drillers, Oilfield Review, Autumn 2013, p. 32-47.

U.S. Pat. No. 6,021,577 Borehole surveying [IFR2]

SPE-49061-MS (1998) Williamson, H. S. et al., Application of Interpolation In-Field Referencing to Remote Offshore Locations [IFR2]

SPE-30452-MS (1995) Russell, J. P., et al., Reduction of Well-Bore Positional Uncertainty Through Application of a New Geomagnetic In-Field Referencing Technique [IFR2]

space.dtu.dk/english/Research/Scientific_data_and_models/Magnetic_Field_Models

What is claimed is:

1. A method of directional drilling, the method comprising:
   obtaining a single set of in-field referencing (IFR) values for a planned well, the single set of IFR values captured by measuring local geomagnetic field data at a single location in a mid-lateral section of the planned well;
   generating an improved magnetic model by combining the single set of IFR values with a global magnetic model;
   obtaining downhole magnetic field data, the downhole magnetic field data captured along a borehole using surveying instrumentation, the borehole being drilled for the planned well; and
   determining an orientation of the borehole based on the downhole magnetic field data and the improved magnetic model.

2. The method of claim 1, wherein the local magnetic field data includes a local magnetic declination.

3. The method of claim 2, wherein the local magnetic field data further includes a magnetic inclination and a magnetic field strength.

4. The method of claim 2, wherein an axial interference in a short collar correction is estimated using the magnetic inclination and the magnetic field strength.

5. The method of claim 2, wherein a lateral error in an estimate of a position of the borehole is reduced using the local magnetic declination.

6. The method of claim 1, wherein the local geometric field data is measured using aeromagnetic surveying.

7. The method of claim 1, wherein determining the orientation of the borehole includes determining an azimuthal orientation of a tool axis along the borehole relative to magnetic north.

8. The method of claim 1, wherein a steerable drilling bit is steered based on the orientation of the borehole.

9. The method of claim 1, wherein a pathway of the borehole is determined using the improved magnetic model.

10. The method of claim 1, wherein a pathway for each of one or more existing lateral wells is determined using the improved magnetic model, a preplanned path being determined for a second borehole based on the pathways for the one or more existing lateral wells.

11. The method of claim 1, wherein the improved magnetic model is used in connection with at least one of: wellbore clearance, wellbore avoidance, wellbore intercept, or remote operations.

12. The method of claim 1, wherein the downhole magnetic field data is captured at a plurality of locations along the borehole.

13. A method of directional drilling, the method comprising:
    identifying a planned wellbore pathway, the planned wellbore pathway having a middle area of a lateral section;
    obtaining a single set of in-field referencing (IFR) values for the planned wellbore pathway, the single set of IFR values captured at a single location in the middle area of the lateral section;
    obtaining a global magnetic model corresponding to the Earth's magnetic field;
    generating an improved magnetic model by correcting the global magnetic model for local anomalies using the single set of IFR values; and
    optimizing the planned wellbore pathway using the improved magnetic model.

14. The method of claim 13, wherein a wellbore is directionally drilled according to the planned wellbore pathway optimized using the improved magnetic model.

15. The method of claim 13, wherein the single set of IFR values includes at least one of a local magnetic declination, a magnetic inclination, and a magnetic field strength.

16. The method of claim 13, wherein a steerable drilling bit is steered based on the planned wellbore pathway optimized using the improved magnetic model.

17. A method of directional drilling, the method comprising:
    obtaining a single set of in-field referencing (IFR) values for a planned well, the single set of IFR values captured at a single location in a mid-lateral section of the planned well;
    obtaining a global magnetic model corresponding to the Earth's magnetic field;
    generating an improved magnetic model by correcting the global magnetic model for local anomalies using the single set of IFR values; and
    generating a directional drilling plan based on the improved magnetic model.

18. The method of claim 17, wherein generating the directional drilling plan includes determining an orientation of a borehole based on downhole magnetic field data and the improved magnetic model, the borehole being drilled for the planned well.

19. The method of claim 18, wherein the downhole magnetic field data is captured at one or more locations along the borehole.

20. The method of claim 17, wherein the directional drilling plan includes at least one of: wellbore clearance, wellbore avoidance, wellbore intercept, or remote operations.

* * * * *